INVENTORS
FRANK HRIBAR, JR.
WAYLAND A. TENKKU
John D. Haney
ATTY.

3,397,717
DIRECTIONAL CONTROL AND PRESSURE REGULATING VALVE

Wayland A. Tenkku, Mentor, and Frank Hribar, Jr., Kiatland, Ohio, assignors to Fluid Regulators Corporation, Painesville, Ohio, a corporation of Ohio
Filed May 27, 1964, Ser. No. 370,537
2 Claims. (Cl. 137—529)

This invention relates to valves and more particularly to a combination directional control and pressure regulating valve. The invention is especially suitable for aircraft service in pneumatic ice-removal equipment.

The valve of this invention provides for directional control of a fluid pressure medium in response to the operation of an independently actuated motor, preferably an electric motor such as a solenoid. The directional control member of the valve, a plunger, is normally open and operates to block the flow of the system fluid through the valve ports when the motor is energized. The valve is particularly characterized in that the plunger is yieldingly connected to the actuating motor so that the plunger also functions automatically to modulate the system pressure.

The invention will be further described with reference to the accompanying drawings which show, by way of example, a valve made according to and embodying this invention. The valve is described with particular reference to its use in a pneumatic ice-removal system for aircraft. In the drawings.

Figure 1:
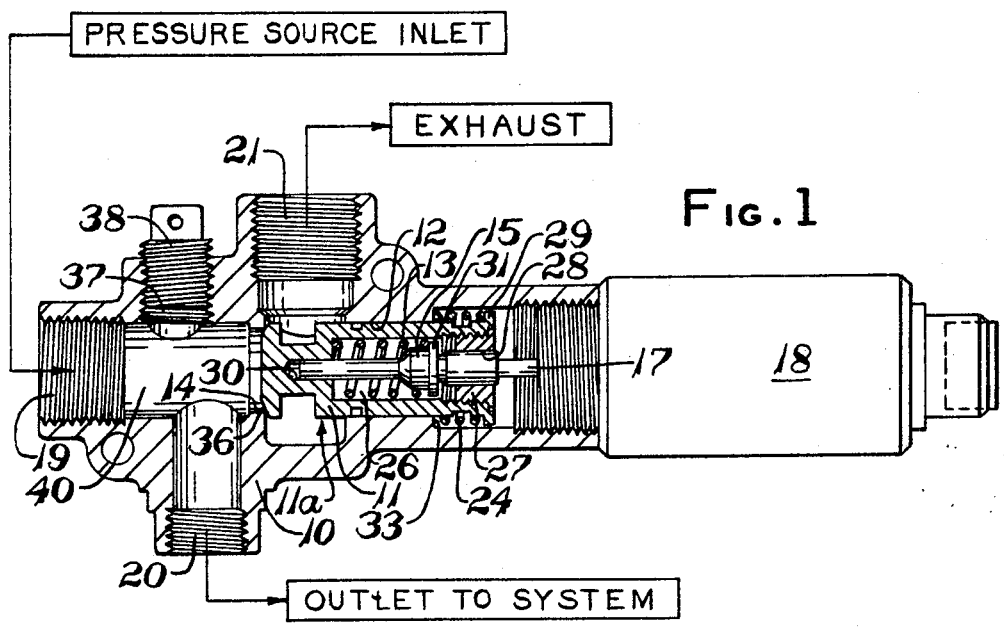
FIG. 1 is an axial cross section of the valve in its energized condition.
Figure 2:
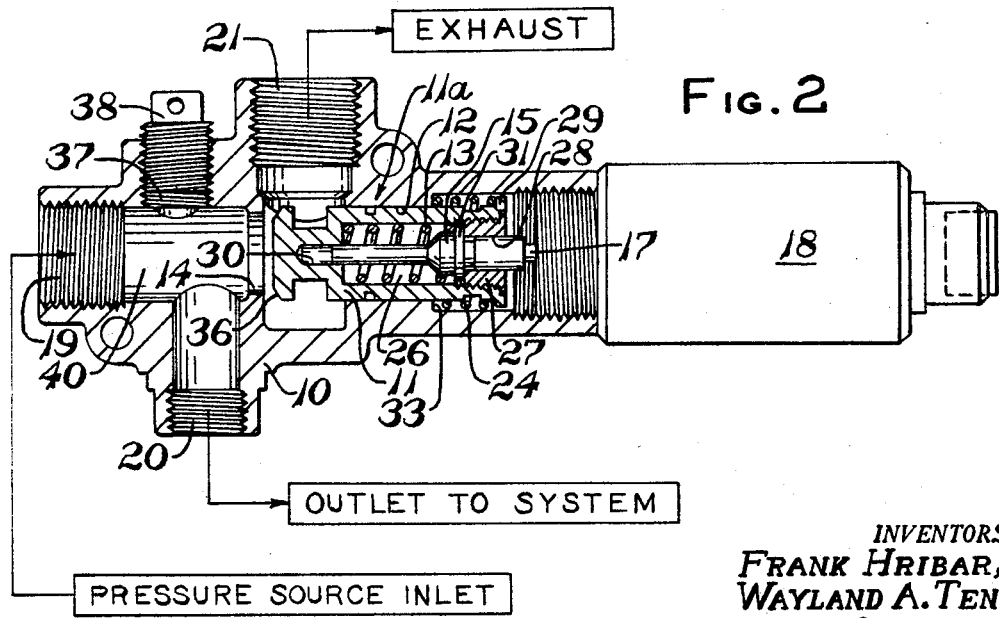
FIG. 2 is an axial cross section of the valve in its normal or de-energized condition.

Referring to the drawings, the valve includes a casing 10, housing a plunger assembly 11a that reciprocates within the bore 12 of casing 10, thereby directing the flow of the fluid medium between the inlet port 19 and the outlet port 20 during the energized cycle of the valve (see FIG. 1), and between inlet port 19 and exhaust port 21 when the valve is in normal or de-energized condition as shown in FIG. 2. The plunger assembly 11a is normally biased toward its open position (shown in FIG. 2) by spring 24. The plunger assembly 11a includes plunger piston 11, a plunger spring 13, a plunger rod 15 and a plug 27. The plunger spring 13 provides a yielding connection between the piston 11 and the rod 15 so that the spring can deflect to permit relative movement between the piston 11 and the rod 15.

Piston 11 is hollow, it having a cavity 26 which is open only to the right end of piston 11 as it is viewed in FIG. 1. In this open end there is a male plug 27 which contains a center bore 28. The outer periphery of piston 11 at this open end has an integral flange 29 that retains a retractor spring 24 as hereinafter described. Piston 11 houses within its cavity 26 the rod 15 and the plunger spring 13. The opposite or closed end of piston 11 has a beveled face or poppet head 36 which is adapted to seat in orifice 14.

Rod 15 has a small diameter at its left end which fits slidably into a mating hole 30 located in the bottom of cavity 26 of the piston 11. In its central portion the rod 15 has a flange 31 adjoining the right end which fits slidably through bore 28 in plug 27 and is in abutting engagement with armature 17 of a motor which in this particular example is a solenoid 18. Plunger spring 13 is a wire coil spring which is caged under compression between the bottom of cavity 26 and flange 31.

The retractor spring 24 is compressed between a shoulder 33 in bore 12 of casing 10 and flange 29 on piston 11. Spring 24, under the normal or de-energized condition, biases the entire plunger assembly 11a so that the beveled edge face 36 of piston 11 is spaced away from its seat on orifice 14 as shown in FIG. 2.

A test port 37, sealed by plug 38, is provided in casing 10 to provide access to the interor region 40 of the casing 10.

Ice-removal from airfoils is effected by alternately inflating and deflating pneumatic tubes mounted along such airfoils thereby shattering any film of ice forming on such airfoil.

When using this valve in an aircraft ice-removal system of this type, the inlet port 19 is connected to a source of fluid pressure, such as the pressure outlet connection of an engine-driven pump or the like (not shown). Exhaust port 21 is connected to an overboard vent (not shown) through which the system fluid, viz. air may be exhausted to the surroundings. The outlet port 20 is communicated to the inflatable ice-removal tubes.

During the deflation phase of the operating cycle of the ice-removal equipment, the valve of this invention is normally open in the condition shown in FIG. 2 so that the pressure source at the inlet port 19 is vented through the valve directly to exhaust port 21. Additionally, the inflatable tubes are also vented to the exhaust port 21 through outlet port 20.

To begin the inflating phase of the operating cycle, the solenoid 18 is operated to close the plunger piston 11 tightly on its seat at orifice 14 (the FIG. 1 condition). This action directs the fluid pressure medium through outlet port 20 into the ice-removal tubes to inflate them.

Energizing the solenoid 18 thrusts rod 15 forcefully leftward toward the position in which the rod is shown in FIG. 1, thereby exerting an axial compressive force on plunger spring 13. The plunger spring 13 in turn transmits such force to the piston 11, displacing the piston 11 against the resistance of retraction spring 24 until face 36 is tightly seated against orifice 14. Even after the piston face 36 is seated however, the rod 15 can continue its leftward movement to the end of its available stroke depending on the stroke of armature 17. In the preferred construction the force required to deflect (i.e. compress) plunger spring 13 is significantly greater than the force required to deflect retractor spring 24. The spring rate of spring 13, and the stroke of rod 15 are selected, so that when the rod 15 is fully extended, the piston 11 is still yieldingly engaged with the plunger and adapted for some limited movement relative to the plunger away from the orifice 14. The solenoid remains energized throughout the period the valve piston 11 is closed on the orifice 14.

As soon as a predetermined pressure develops in the casing between inlet port 19 and outlet port 20 while the valve is energized, the resulting pressure force acts upon the face 36 of piston 11 to displace the piston 11 rightward, unseating it from orifice 14 and further compressing spring 13. Consequently, the piston 11 automatically modulates the system pressure thereafter at the predetermined level which caused the piston 11 to open.

When the solenoid 18 is subsequently de-energized, spring 24 and spring 13 expand thrusting rod 15, and consequently armature 17, rightward. The pressure on face 36 of piston 11 and expansion of retraction spring 24 cause piston 11 to move rightward thereby unseating said piston 11. The combined expansion of spring 13 and spring 24 acting on plunger 15 and piston 11 respectively, assure the proper resetting of armature 17 in solenoid 18 as to the position shown in FIG. 2, and spring 13 additionally shifts piston 11 relative to rod 15 to restore the piston to its FIG. 2 position.

Variations of the construction discussed may be made within the scope of the appended claims.

We claim:
1. A valve comprising:
   (A) a casing;
   (B) two flow ports in the casing;
   (C) an orifice in the casing between said flow ports;
   (D) a plunger member which reciprocates in the casing to control the direction of the flow of a fluid pressure medium through the casing from one port to the other port;
   (E) a poppet head at one end of said plunger member adapted to seat in said orifice to block communication between said flow ports when said plunger is at one extreme of its reciprocating stroke;
   (F) means biasing said plunger member to a position in the casing in which said ports are normally in communication with each other;
   (G) a motor for displacing the plunger member against the resistance of said biasing means to a position to close the aforesaid communication between said ports; and
   (H) means within said plunger for yieldingly connecting said motor with said plunger member, said yielding connecting means:
      (1) acting to yieldingly transmit the displacing force from said motor to said plunger member and
      (2) being responsive to the fluid pressure medium at one of said ports to modulate the pressure of said medium by permitting displacement of said plunger member to selectively re-communicate said ports.

2. A valve according to claim 1 wherein;
   (A) said plunger member is a hollow piston slidable axially in said casing, and
   (B) said means for yieldingly connecting said motor with said plunger to a spring mounted inside said piston and connected to said motor member and adapted for deflection to permit relative movement between said piston and said motor member.

References Cited
UNITED STATES PATENTS

| | | | |
|---|---|---|---|
| 1,049,845 | 1/1913 | Geissinger | 251—129 |
| 2,673,450 | 3/1954 | Wolf | 137—522 |
| 2,942,622 | 6/1960 | Hahn | 251—77 |
| 3,174,499 | 3/1965 | Mott | 137—82 |

FOREIGN PATENTS

| | | |
|---|---|---|
| 1,378,144 | 9/1963 | France. |
| 946,275 | 1/1964 | Great Britain. |

WILLIAM F. O'DEA, *Primary Examiner.*

H. COHN, *Assistant Examiner.*